UNITED STATES PATENT OFFICE 2,485,187

CONDENSATION PRODUCTS OF METHYLOL ALIPHATIC DIUREAS AND METHYLOL AMINOTRIAZINES

Henry M. Cadot, Greenville, Del., assignor to E. I. du Pont de Nemours & Company, Wilmington, Del., a corporation of Delaware No Drawing. Application May 5, 1944,
Serial No. 534,347

1 Claim. (Cl. 260—17.3)

This invention relates to improvements in the manufacture of resinous compositions, and to certain novel products which may be prepared by the interaction of methylol aminotriazines with aliphatic diureas and related compounds. More particularly the products with which this invention is concerned are the condensation products of methylol aminotriazines with aliphatic diureas or their N-methylol derivatives, said aliphatic diureas being represented by the formula $$H_2NCONH(C_nH_{2n})NHCONH_2$$

wherein $n$ is an integer.

It has been reported heretofore that aliphatic diureas may condense with formaldehyde to yield resins of the urea-formaldehyde type (H. W. Arnold, U. S. Patent, 2,145,242). It has also been reported that methylene diurea may react with formaldehyde to form monomethylol, and dimethylol methylene diureas, and that the latter compound is convertible to a colorless, transparent, hard resin when heated under pressure (Kadowaki, Bull. Chem. Soc. Japan 11, 253 (1936)). The Arnold patent describes the preparation of glossy films by condensation of hexamethylene diurea with formaldehyde in the presence of a monohydric alcohol at a pH of 8.0, and at a temperature of 90° to 100° C., followed by evaporation of solvent from the resulting reaction mixture.

The aliphatic diurea-formaldehyde resins have exhibited certain disadvantages which hitherto have limited their use in coating and molding compositions. For example, it has been observed that when the ratio of formaldehyde to aliphatic diurea initially was high, the condensation products in many instances had poor water resistance, although they had good flowing characteristics on molding, and good impact strength. On the other hand, when the formaldehyde to aliphatic diurea ratio initially was low, the impact strength of the resinous condensation product generally was poor, although the water resistance was in certain instances exceptionally good.

An object of this invention is to provide improved aliphatic diurea-formaldehyde resin compositions. A further object is to provide aliphatic diurea-formaldehyde resin compositions which possess good molding properties, high impact strength and excellent water resistance.

These and other objects are accomplished in accordance with this invention by treating aliphatic diureas, or methylol derivatives thereof, with methylol aminotriazines. This invention contemplates the condensation of aliphatic diureas or their methylol derivatives with methylol aminotriazines to obtain products which yield resins not possessing the aforesaid undesirable characteristics of the aliphatic diurea-formaldehyde condensation products.

In one specific embodiment of this invention trimethylol melamine is admixed with an N-methylol derivative of an aliphatic diurea of the formula $NH_2CONH(C_nH_{2n})NHCONH_2$ in an aqueous or alcoholic medium at a pH of 7 to 10. The resultant products, which are thermally hardenable, may be isolated by evaporation of the solvent from the reaction mixture thus obtained.

The nature of the products obtained by condensing methylol aminotriazines with methylol aliphatic diureas in accordance with this invention varies with the choice of the reactants, the proportion of methylol aminotriazine to methylol aliphatic diurea initially present in the reaction mixture, and the conditions of temperature, pH, and reaction time under which the reaction is effected. Thus, by admixing trimethylol melamine with trimethylol methylene diurea in various proportions at a pH of 8.0 to 9.0, and at a temperature in the range of 50° to 100° C., products are obtained, which, when hardened under heat and pressure, yield resins which vary in properties according to the ratio of trimethylol melamine: trimethylol methylene diurea initially present. When this ratio is high, the properties resemble those of the methylol melamine resins (which are deficient in impact strength, but have good water resistance) and when this ratio is low, the resins resemble the trimethylol aliphatic diurea resins (which frequently are deficient in water resistance, yet have good impact strength). In between these extremes and particularly when the proportion (by weight) of trimethylol melamine to trimethylol aliphatic diurea initially is within the range between 0.1:1 and 0.2:1, the resins possess a surprising combination of desirable properties, namely good water resistance, high impact strength, and excellent molding characteristics.

The invention accordingly embodies the discovery that compounds of the formula $$H_2NCONH(C_nH_{2n})NHCONH_2$$

and the methylol derivatives thereof may be reacted with methylol melamine to yield resins which do not have the deficiencies of resins derived individually from the component resin-forming reactants.

The aliphatic diureas which may be used in accordance with this invention include methylene diurea, ethylene diurea, ethylidene diurea, and polymethylene diureas in general, such as hexamethylene diurea and decamethylene diurea. Methods for preparing the polymethylene diureas are described in the Arnold Patent U. S. 2,145,242. Methylene diurea of suitable quality for use in the present invention is preferably prepared by the improved method disclosed hereinafter (cf. Example 1).

The methylol aminotriazines, which may be reacted with the aliphatic diureas in accordance with this invention include mono-, di- and trimethylol melamine or mixtures of these materials, and also the methylol derivatives of various substituted aminotriazines such as the 2-alkoxyalkyl- and 2-alkoxyalkoxyalkyl-4,6-diaminotriazines disclosed in the Gresham application S. N. 511,476, filed November 23, 1943. Melamine itself, without incorporating therewith free or combined formaldehyde, is generally not employed as a substitute for the methylol aminotriazines in the practice of this invention. Moreover, formaldehyde in the absence of methylol aminotriazines is not generally employed, since one of the functions of the methylol aminotriazine is to provide the formaldehyde reactant, without imparting water sensitivity to the product. The affinity of aminotriazines for formaldehyde is sufficiently strong to cause removal of loosely bound formaldehyde from certain methylol polymethylene diureas, especially those which contain a high proportion of methylol groups, with the resultant formation of methylol melamines.

In the practice of the invention the methylol aliphatic diurea may first be prepared, suitably by heating the aliphatic diurea with formalin at a pH of about 7.0 to 10.0. The reaction time depends upon the temperature, but about 15 minutes is usually sufficient if the temperature is about 90° to 100° C. The amount of formaldehyde employed may be about 1.5 to 4.0 moles per mole of aliphatic diurea. Excellent results are obtained when the molal ratio of formaldehyde to aliphatic diurea is more than 2:1. The resulting condensation product may be isolated by any convenient process such as by evaporation of solvent at low pressure, heating in a drying oven, or by spray or drum drying. Preferably, it is used in the form of an aqueous solution to impregnate a suitable filler, after which the water is removed by drying. The dried material may then be admixed with preformed methylol aminotriazine (preferably trimethylol melamine), either in a ball mill or other suitable apparatus. Alternatively, the methylol aminotriazine may be introduced into the mixture prior to removal of the solvent. Still another alternative procedure is to add initially an excess of formaldehyde over that required for formation of the desired methylol aliphatic diurea and to prepare methylol melamine from the residual formaldehyde prior to removal of the solvent.

If the product is to be used in a molding composition, suitable fillers, accelerators, and other ingredients may be added either before or after evaporation of the solvent. When a cellulose filler is used, it may be added prior to removal of the solvent from the condensation mixture, so as to obtain optimum impregnation of the filler with the resin ingredient. The amount of cellulose filler is preferably about 0.2 to 1.0 part per part of resin.

The invention is further illustrated by means of the following examples in which parts by weight are given unless otherwise indicated.

*Example 1.*—A mixture containing 1540 parts of urea and 1540 parts of water is heated to a temperature of 60° C. To this solution are added 2 parts of concentrated hydrochloric acid and 260 parts of 37% formalin, which gives a mixture having a pH of about 4.0. This solution is kept at 60° C. for four hours, after which it is allowed to cool to room temperature and stand for 48 hours. The resulting precipitate is filtered off and washed with 2 liters of 90% ethyl alcohol, after which it is air dried at room temperature. The quantity of methylene diurea obtained in several runs, made as thus described, varies from 230 to 255 parts, which corresponds to a yield of 55 to 60% based on formaldehyde.

*Example 2.*—To 184.5 parts of 37% aqueous formaldehyde solution are added 7.6 parts of 0.2 molal aqueous $Na_2HPO_4$ whereby a solution having a pH of 6.75 is obtained. To this is added sufficient 2 N NaOH (15 parts) to cause the pH to rise to 9.5. The resulting solution is mixed with 100 parts of methylene diurea (prepared as described in Example 1) and the mixture is heated at 89° C. for 15 minutes. This gives a mixture which has a pH of 7.5. Analysis for formaldehyde shows the presence of 12.3 parts of HCHO, which indicates that about 2.4 moles of formaldehyde have combined per mole of methylene diurea. The weight of melamine (17.2 parts) required to convert this residual formaldehyde to trimethylol melamine is calculated, and this amount of melamine is introduced. The heating is continued under reflux at 90° to 95° C. for 13 minutes which causes the pH to drop to 7.35. The resulting product contains very little formaldehyde and is a solution of methylol methylene diurea (HCHO:methylene diurea=2.4) and trimethylol melamine in water. The pH of this solution is lowered to 6.3 by addition of 1.7 parts of 8.5% phosphoric acid, and the solution, while hot, is mixed with 61 parts of pulverized alpha cellulose. After this, the resinous mass is removed from the reaction vessel and is dried for 8 hours in an oven at 110° F. The resulting dry solid is then subjected to treatment in a swing-hammer type pulverizer to give a satisfactory molding powder.

*Example 3.*—Into a reaction vessel, which is equipped with a stirrer and reflux condenser, is introduced a mixture containing 132 parts of methylene diurea and 243 parts of 37% formalin solution. The pH of the formalin is first adjusted to 7 with disodium phosphate solution, and then to 9.5 by addition of 2 N sodium hydroxide solution. The mixture (resulting pH=7.5) is heated to reflux temperature, and the ensuing reaction is allowed to continue for about ½ hour, at the end of which time sufficient phosphoric acid is added to reduce the pH to about 5. The stirring is continued for about 5 minutes during which time the temperature drops to below reflux temperature. Pulverized alpha cellulose (111 parts) is then mixed with the solution. The resulting resinous mass contains cellulose impregnated with trimethylol methylenediurea. The impregnated cellulose is removed to a drying oven where it is heated for several hours at a temperature of 40° to 45° C. Ninety parts of the dried solid is then ball-milled with 10 parts of trimethylol melamine (containing one-third cellulose filler based on total solids) and 0.2 part of beta-bromohydrocinnamic acid, which serves as a molding accelerator in the resulting molding powder.

Disks (2" diameter x 0.1" thick) molded from this powder under pressure at a temperature of 140° to 150° C. (20 minutes molding time), are found to have an impact strength (Dynstat) of 1.8 foot pounds per square inch.

Repetition of this experiment using the cellulose filler, and using as the thermally hardenable resin intermediate either (a) 100% trimethylol methylene diurea or (b) 100% trimethylol melamine, gives inferior resinous products. When the amount of cellulose filler is one-third of the weight of the resin intermediate, the impact strength of the molded product is 2.02, in the case of the resin derived from 100% trimethylol methylene urea, and 1.2 when the resin is derived from 100% trimethylol melamine. The water absorption is 0.051 with the trimethylol methylene diurea product, and 0.004 with trimethylol melamine product. When the proportions are 83% trimethylol methylene diurea and 17% trimethylol melamine the impact strength is 1.57 and the water absorption is 0.018 gram per square inch of surface after 15 minutes in boiling water. The latter mixture flows well during molding, and gives a disk which has good translucence. Thus, the resins obtained by combining trimethylol melamine with trimethylol methylene diurea were markedly superior to the resins obtained from either intermediate in the absence of the other.

*Example 4.*—A mixture containing 62.8 parts hexamethylene diurea and 100 parts of 37% formalin solution is brought to a pH of 7.0 by titration with triethanol amine, and the resultant solution is heated under refluxing conditions for about 20 minutes. The mixture is thereafter cooled to room temperature, and 10 parts of trimethylol melamine are added with thorough mixing. The thick liquid thus obtained is tested as a plywood adhesive by applying it to two surfaces of birch veneer (29 lbs. of the adhesive solids per 100 square feet of area at the glue) and thereafter bonding the plywood by heating for about 3 minutes at a temperature of 135° to 140° C. under a pressure of 187 pounds per square inch. The resulting plywood has a satisfactory shear strength.

The methylolmelamine-aliphatic diurea resins which may be prepared in accordance with this invention find applications in the manufacture of molded products, coatings, lacquers, adhesives, impregnating and laminating compositions, electrical insulators, and a wide variety of similar uses.

The molding powders prepared by the general method herein described may be incorporated with suitable pigments, fillers, mold lubricants, accelerators, and the like. The preferred fillers are cellulosic materials, like wood flour or alpha cellulose. Suitable accelerators or latent catalysts include materials which yield acid upon hydrolysis, such as trialkyl phosphates, aliphatic acid anhydrides, aliphatic acid lactones, amine salts, halogenated amides, halogenated esters and halogenated nitriles. Acidic salts such as zinc sulfate, ammonium sulfate, ammonium chloride, ferric sulfate, and the like, may be employed if desired. The accelerators should be present preferably in the proportion of about 0.05 to 0.50% of the total weight of resin. The molding powders thus obtained may be molded by heating under pressure for about 3 to 20 minutes at a temperature of 110° to 175° C., preferably 140° to 150° C.

When the resinous compositions prepared by the process of the present invention are to be used in the manufacture of coating compositions, it is desirable to condense the methylol melamine with the aliphatic diurea in the presence of an aliphatic alcohol, such as isobutyl alcohol, at a temperature of about 20° to 100° C. and in the presence of suitable buffers. The solvent may thereafter be removed if desired. The resins obtained in this manner are sufficiently soluble in lacquer solvents to be employed as components of coating compositions.

In the manufacture of adhesives containing the herein disclosed resins it is generally desirable to prepare the initial condensation products in aqueous solution at a pH of about 7.0 to 8.0. The formaldehyde-polymethylene diurea primary condensation products, which yield satisfactory adhesives, are particularly sensitive to acid-reacting catalysts and, in order to avoid premature resinification, it is generally desirable that strongly acid media be avoided when these condensation products are present. In fact, thermally hardenable adhesives are obtained from such condensation products without the addition of catalysts.

The above description and examples are intended to be illustrative only, and the invention is not limited in any way by the specific modifications described herein in detail. It will be understood that many apparently widely different embodiments of the invention may be made without departing from the spirit and scope thereof.

I claim:

In a process for the manufacture of resinous products, the steps which comprise incorporating a cellulose filler at a pH of 5 to 6.3 with a methylol mono methylene diurea having from 2.4 to 3.0 methylol groups per unit of monomethylene diurea, and N-trimethylol melamine, the weight proportion of N-trimethylol melamine to methylol monomethylene diurea being from 10:90 to 17:83, and thereafter thermally hardening the resulting mixture in the presence of an accelerator which liberates acid on hydrolysis.

HENRY M. CADOT.

REFERENCES CITED

The following references are of record in the file of this patent:

UNITED STATES PATENTS

| Number | Name | Date |
|---|---|---|
| 2,145,242 | Arnold | Jan. 31, 1939 |
| 2,213,578 | Cordier | Sept. 3, 1940 |
| 2,294,873 | D'Alelio | Sept. 1, 1942 |
| 2,328,425 | D'Alelio | Aug. 31, 1943 |
| 2,366,494 | D'Alelio | Jan. 2, 1945 |
| 2,400,016 | Meyer | May 7, 1946 |

FOREIGN PATENTS

| Number | Country | Date |
|---|---|---|
| 506,507 | Great Britain | May 30, 1939 |
| 844,364 | France | Apr. 17, 1939 |

OTHER REFERENCES

Kadowaki Bull. Chem. Soc., Japan 11, 248–261 (1936).

Gams British Plastics, Feb. 1943, pages 508–520.